(12) United States Patent
Kim et al.

(10) Patent No.: US 6,934,883 B2
(45) Date of Patent: Aug. 23, 2005

(54) DATA DOWNLOAD METHOD THROUGH MULTIMEDIA DEVICE

(75) Inventors: Byoung-Soo Kim, Seoul (KR); In-Yong Ha, Seoul (KR)

(73) Assignee: Robotis Co., Ltd., Seoul (KR)

( * ) Notice: Subject to any disclaimer, the term of this patent is extended or adjusted under 35 U.S.C. 154(b) by 468 days.

(21) Appl. No.: 09/805,873

(22) Filed: May 21, 2001

(65) Prior Publication Data

US 2001/0052086 A1 Dec. 13, 2001

(30) Foreign Application Priority Data

Jun. 9, 2000 (KR) .......................................... P 0031886

(51) Int. Cl.$^7$ .......................... G06F 11/00; G01R 31/28
(52) U.S. Cl. ........................................ 714/25; 345/339
(58) Field of Search ............................... 714/25, 27, 31, 714/32, 37, 39, 45, 48, 57, 819, 821, 824; 345/339, 340, 341

(56) References Cited

U.S. PATENT DOCUMENTS

| | | | |
|---|---|---|---|
| 4,683,420 A | * 7/1987 | Goutzoulis | 324/96 |
| 5,767,893 A | 6/1998 | Chen et al. | |
| 5,920,821 A | * 7/1999 | Seazholtz et al. | 455/466 |
| 5,953,005 A | 9/1999 | Liu | |
| 5,956,716 A | 9/1999 | Kenner et al. | |
| 6,105,074 A | 8/2000 | Yokote | |
| 6,166,735 A | 12/2000 | Dom et al. | |
| 6,269,421 B1 | * 7/2001 | Nishimura | 711/103 |
| 6,296,489 B1 | * 10/2001 | Blass et al. | 434/185 |
| 6,416,482 B1 | * 7/2002 | Braun et al. | 600/559 |

* cited by examiner

Primary Examiner—Nadeem Iqbal
(74) Attorney, Agent, or Firm—Harness Dickey & Pierce, PLC (57) ABSTRACT

In a method for downloading data through a multimedia device, a screen output device generates a multimedia output representing data to be downloaded through the multimedia device. An analog level comparator compares a level of an electric signal with a reference level, i.e., a reference voltage, and outputs a comparison result signal. A digital signal input device receives the comparison result signal from the comparator. An error correcting section judges whether the downloaded data is damaged based on the comparison result signal from the comparator. If the error is detected, the reference voltage of the analog level comparator is amended, so as to accurately control sensitivity until the error is absent. If the error is not detected, the downloaded data is used.

8 Claims, 9 Drawing Sheets

DATA DOWNLOAD METHOD THROUGH MULTIMEDIA DEVICE

BACKGROUND OF THE INVENTION

1. Field of the Invention

The present invention relates to a data download method through a multimedia device such as a TV, a computer, a radio, a VTR, a mobile communication terminal (e.g. an IMT2000, an internet phone, a picture telephone set, etc.), that is capable of outputting multimedia, for example, audio and image, and usually used by people.

2. Prior Art

Conventionally, in data download methods, there is a method using a receiving device which is connected with a communication cable and a method using infrared rays such as an IRDA (Infra Red Data Association) or an IR (Infra-Red) remote senser. All conventional methods are difficult to set up and to perform. For example, when data is downloaded from a computer, a hardware of communication interface which is used to download data from the computer to a receiver and a software driver should be installed in the computer except general hardware, e.g., a monitor, keyboard, etc.

In the above mentioned prior arts, transmission speed is rapid and stability is good, but additional cost and installation should be carried out. Therefore, the prior arts are not suitable to apply in an application field in which a transmission speed and stability is not important or in which installation and usage are simple and cost is cheap.

SUMMARY OF THE INVENTION

It is an object of the present invention to provide a simple method for data download using a screen or sound output of a multimedia device.

In order to achieve the above objects, a method according to one aspect of the present invention comprises the steps of: a) generating a multimedia output representing data to be downloaded through the multimedia device; b) converting the multimedia output in step a) into an electric signal by a receiver; c) comparing a level of the electic signal with a reference level and outputting a comparison result signal; and d) judging whether downloaded data is damaged based on the comparision result signal in step c).

Preferably, the multimedia output includes light or sound.

Preferably, change of the multimedia output appears by luminosity or color. More preferably, change of the multimedia output simultaneously or successively appears by changing the light and sound.

In order to achieve the above objects, a method according to one aspect of the present invention comprises the steps of: e) generating a multimedia output representing data to be downloaded through the multimedia device; f) converting the multimedia output in step e) into an electric signal; g) converting the electric signal of step f) into a digital signal; h) comparing the digital signal with a reference signal and outputting a comparison result signal; and I) judging whether the download data is damaged based on the comparison result signal in step h).

According to the present invention, a data download method through a multimedia device will not to require additional cost nor installation of an additional device or software driver.

BRIEF DESCRIPTION OF THE DRAWINGS

This invention will be better understood and its various objects and advantages will be more fully appreciated from the following description taken in conjunction with the accompanying drawings, in which.

DETAILED DESCRIPTION OF THE PREFERRED EMBODIMENT

Preferred embodiments of the present invention will be illustrated below with reference to the accompanying drawings.

Figure 1:
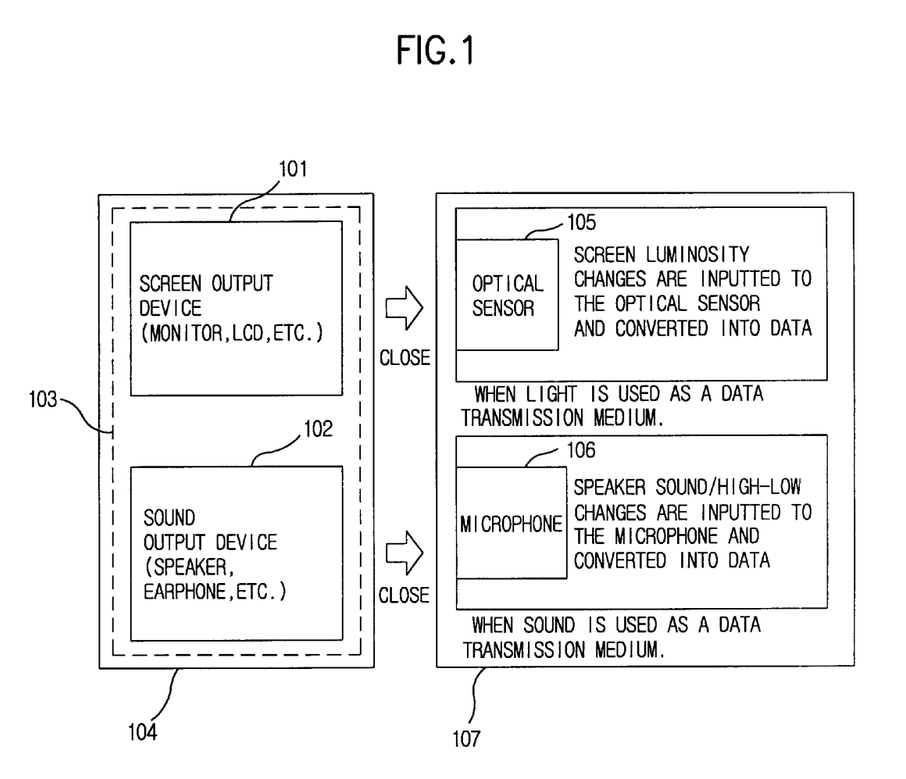
FIG. 1 is a block diagram for showing a system according to the present invention.

FIG. 1 shows block diagrams for illustrating a basic principle about a data download method through a multimedia device according to the present invention. Referring to FIG. 1, the multimedia device 104 includes at least one between a screen output device 101 and a sound output device 102 so as to apply the screen output device 101 and the sound output device 102 as a data output device 103. For example, the data output device 103 corresponds to a monitor, an LCD, etc. in a computer to display a picture, and corresponds to a screen or speaker in a television. The data output device 103 corresponds to an LCD or speaker in a mobile communication terminal and a speaker or an earphone in a radio.

As shown in FIG. 1, a receiver 107 for downloading data is closed to the output device 103. The receiver 107 changes a medium outputted from the output device 103 into data using a senser of the receiver 107.

When light is a transmission medium, a light acceptance element such as an optical senser 105 in the receiver 107 is used. Accordingly as luminosity or color can change part or all of the screen output device 101 which is used as the output device 103, the transmission signal is detected by the light acceptance element and changed into data.

When sound is a transmission medium, a sound acceptance element such as a microphone 106 within the receiver 107 is used. The sound acceptance element used as the output device outputs four kinds of signals such as high or low sounds, or the existance of sounds. The sound acceptance element detects and changes into data.

Figure 3:
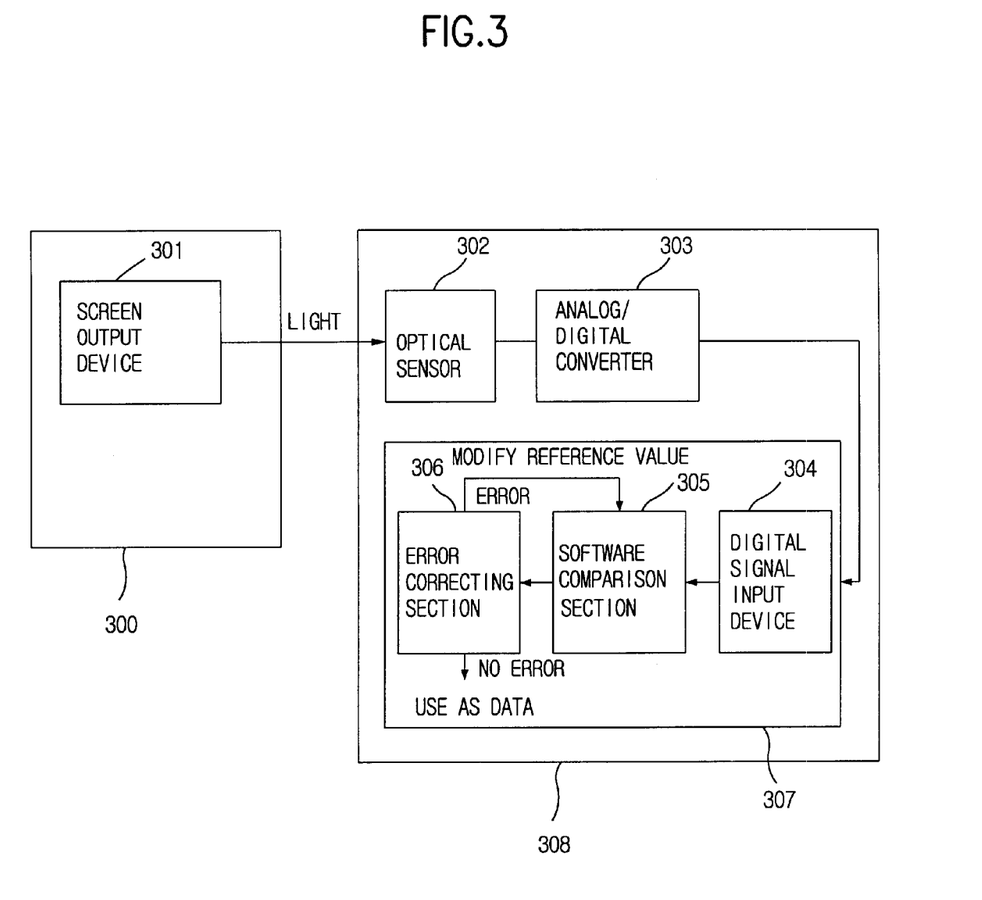
FIG. 3 is a block diagram for illustrating data transmission using an analog/digital converter when sound is transmission medium according to the present invention.

In a data download method through a multimedia device according to this invention, FIG. 3 shows another embodiment of a receiver when a screen output device 301 transmits data using light as data transmission medium.

An optical sensor 302 of the receiver converts the light into an electric signal so as to input into an analog/digital converter 303. An analog level of the inputted electric signal converts into a digital signal through the analog/digital converter 303 so as to input to a microprocessor 307. The inputted digital signal is compared with a reference value in a software comparison section 305 of the microprocessor 307 so as to convert a digital value. An error correcting section 306 judges whether download data is damaged based on the comparison result signal from a software comparison section 305. Herein, if an error is absent, the error correcting section 306 judges the download data is correct data. If the error is detected, the reference voltage of the software comparison section 305 is amended, so as to accurately control sensitivity until the error is absent.

Figure 4:
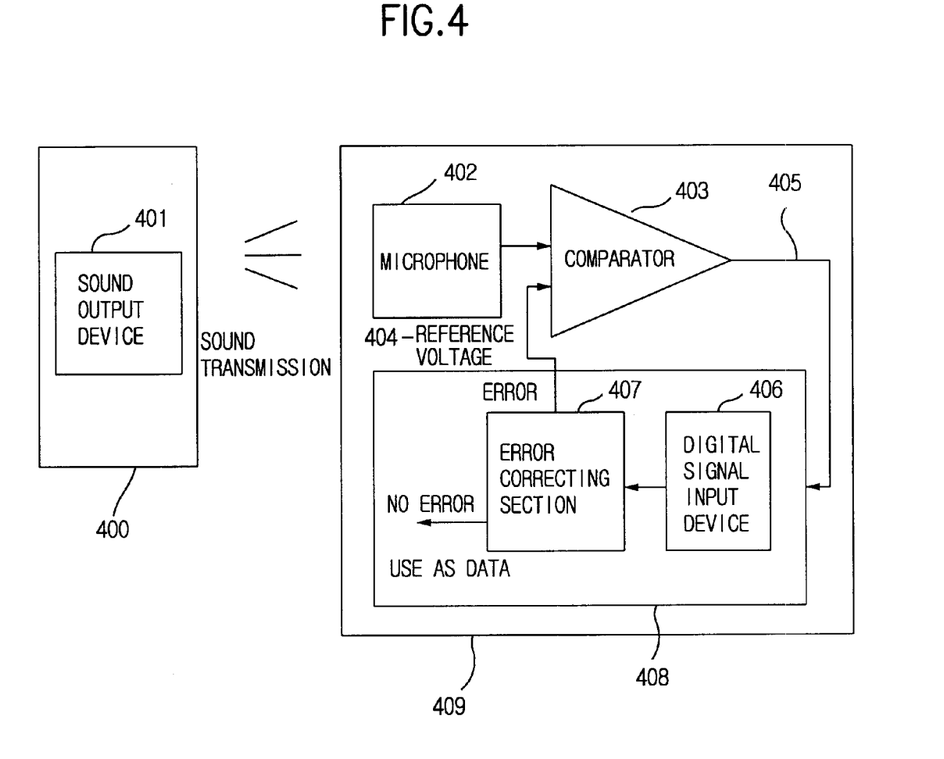
FIG. 4 is a block diagram for illustrating data transmission using an analog level comparator when light is transmission medium according to the present invention.

In a data download method through a multimedia device according to this invention, FIG. 4 shows one embodiment of a receiver when a sound output device 401 transmits data using sound as data transmission medium.

A microphone 402 of the receiver converts the sound into an electric signal and inputs the electric signal into an analog level comparator 403. The analog level of the inputted electric signal compares with a reference voltage 404 so as to convert into a digital signal 405, 0 (zero) or 1. The digital signal is inputted to a microprocessor 408, and an error correcting section 407 that judges whether download is damaged based on the comparison result signal from the comparator 403. Herein, if an error is absent, the error correcting section 407 the judges the download data is correct. If the error is detected, the reference voltage of the analog level comparator 403 is controlled, so as to accurately control sensitivity until the error is absent.

Figure 5:
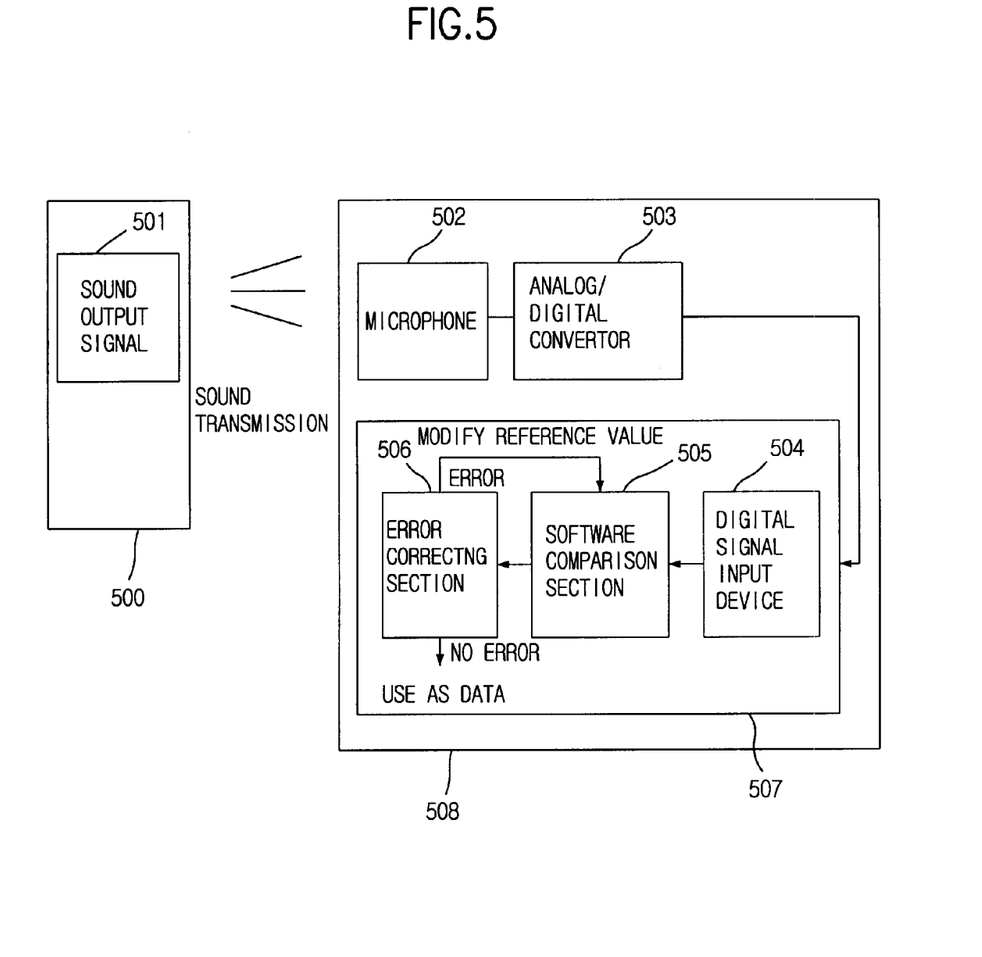
FIG. 5 is a block diagram for illustrating data transmission using an analog/digital converter when sound is transmission medium according to one embodiment of the present invention.

In a data download method through a multimedia device according to this invention, FIG. 5 shows one embodiment of a receiver when a sound output device 501 transmits data using sound as data transmission medium.

A microphone 502 of the receiver converts the sound into an electric signal and inputs the signal into an analog/digital converter 503. The analog level of the inputted electric signal converts into a digital signal through the analog/digital converter 503. The digital signal is inputted to a microprocessor 507. The inputted signal compared with an existing reference value in a software comparison section 505 and converts to a digital value. An error correcting section 506 judges whether download data is damaged based on the comparison result signal from the software comparison section 505. Herein, if an error is absent, the error correcting section 506 judges that the download data is correct. If the error is detected, the reference value of the software comparison section 505 is controlled so as to accurately control sensitivity until the error is absent.

Figure 6:
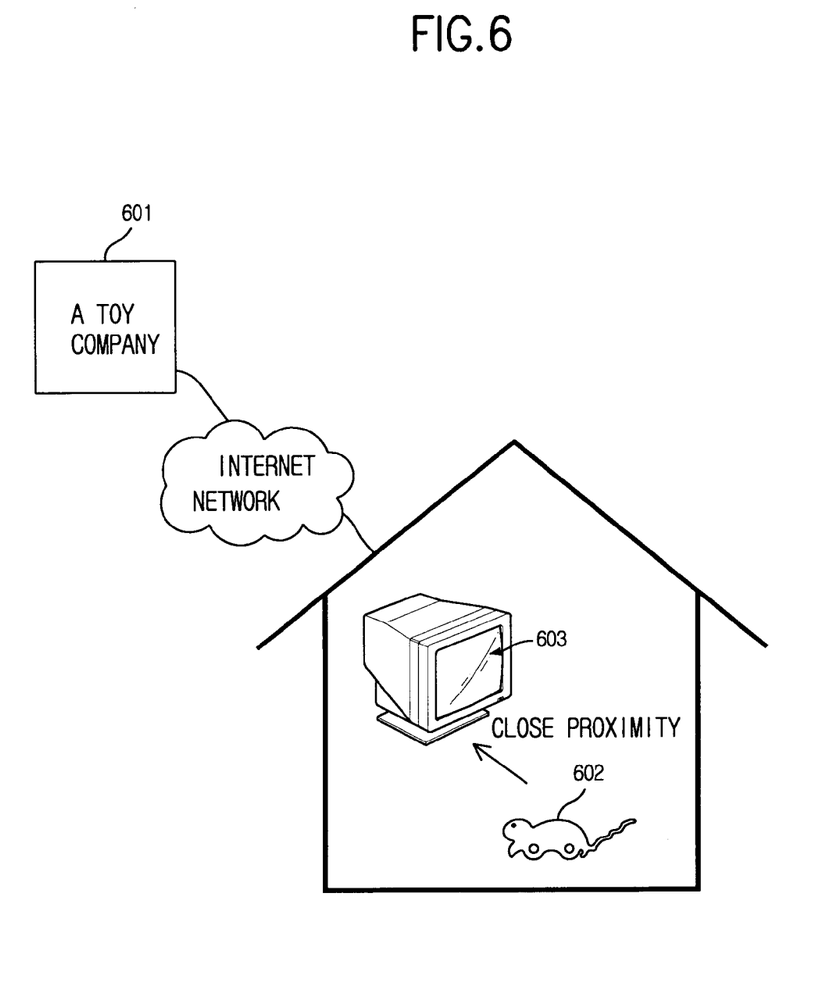
FIG. 6 shows an embodiment of the present invention.

FIG. 6 shows one embodiment of a data download method through a multimedia device according to the invention. Referring to FIG. 6, a toy company 601 which variously performs the receiving data is used as a receiver. The data transmitting to the toy 602 is generally not important regarding the transmission speed to stability of data. However, installation for communication should be simple and cost for receiving data should be inexpensive because users are children. A toy company 601 prepares a screen's luminosity change routine representing the data which will be transmitted to a toy 602 in a homepage. After a user connects to the homepage through Internet and puts the toy 602 close to the computer screen 603, the toy 602 can receive the provided data through the toy company 601 so as to perform various actions based on the data.

Figure 7A:
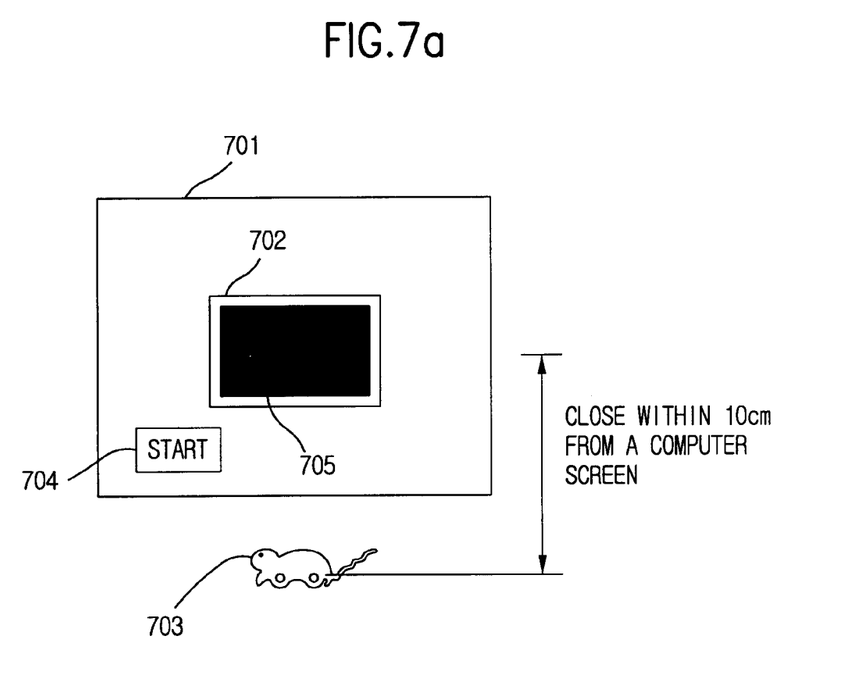
FIGS. 7a and 7b show a data receiving system according to an embodiment of the present invention.
Figure 7B:
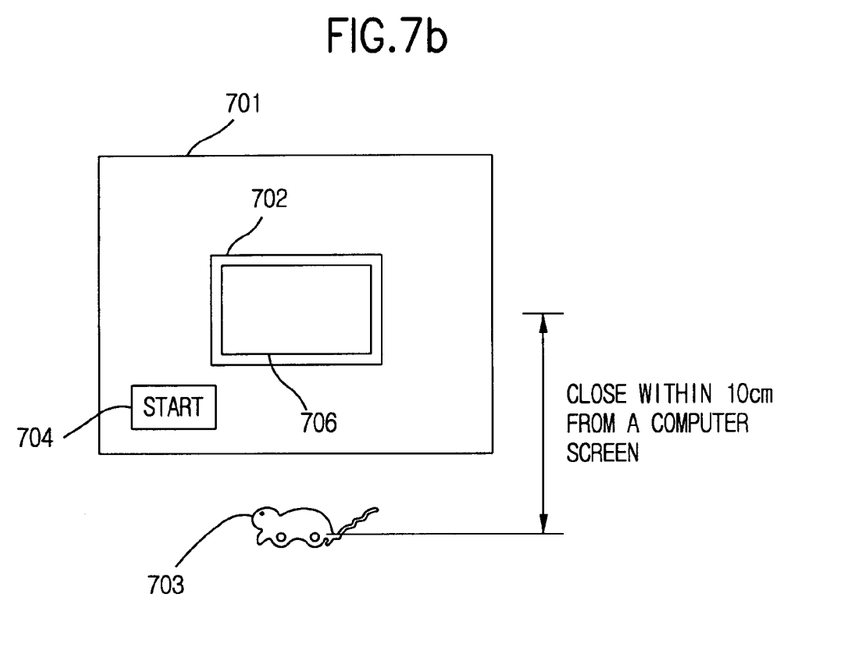

FIGS. 7a and 7b show in detail a receiving system. A user puts a toy 703 close in front of a luminosity change section 702 within a computer screen 701 and then pushes a start button 704 for data download on the computer screen 701.

According to a bit of transmission data, the luminosity change section 702 changes into a black output 705 of FIG. 7a and a white output 706 of FIG. 7b. As shown in FIG. 7a, the luminosity change section 702 shows the black output 705, if a transmission bit is zero (0). As shown in FIG. 7b, the luminosity change section 702 shows the white output 706, if a transmission bit is one (1).

In another embodiment, the luminosity change section 702 can show the black output 705, if a transmission bit is one (1). As shown in FIG. 7b, the luminosity change section 702 can show the white output 706, if a transmission bit is zero (0). Furthermore, this invention includes a method using change of color instead of light and shade, another method using several luminosity change sections, and another method using the whole screen as the luminosity change section 702.

Figure 2:
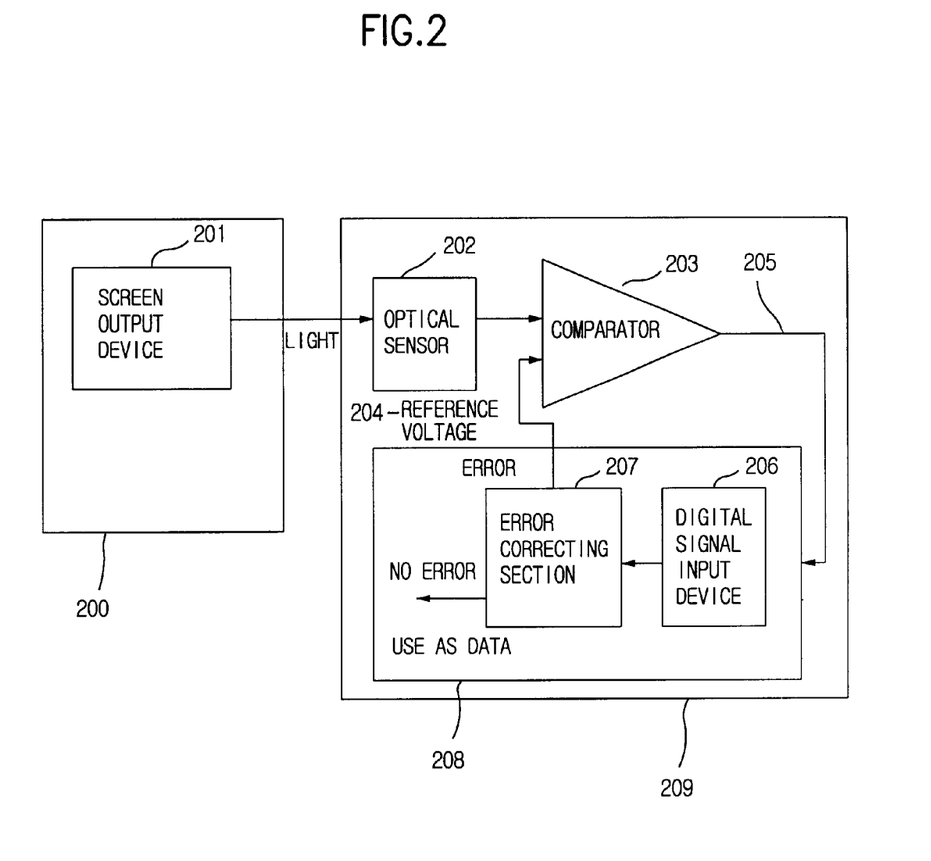
FIG. 2 is a block diagram for illustrating data transmission using an analog level comparator when light is transmission medium according to the present invention.
Figure 8:
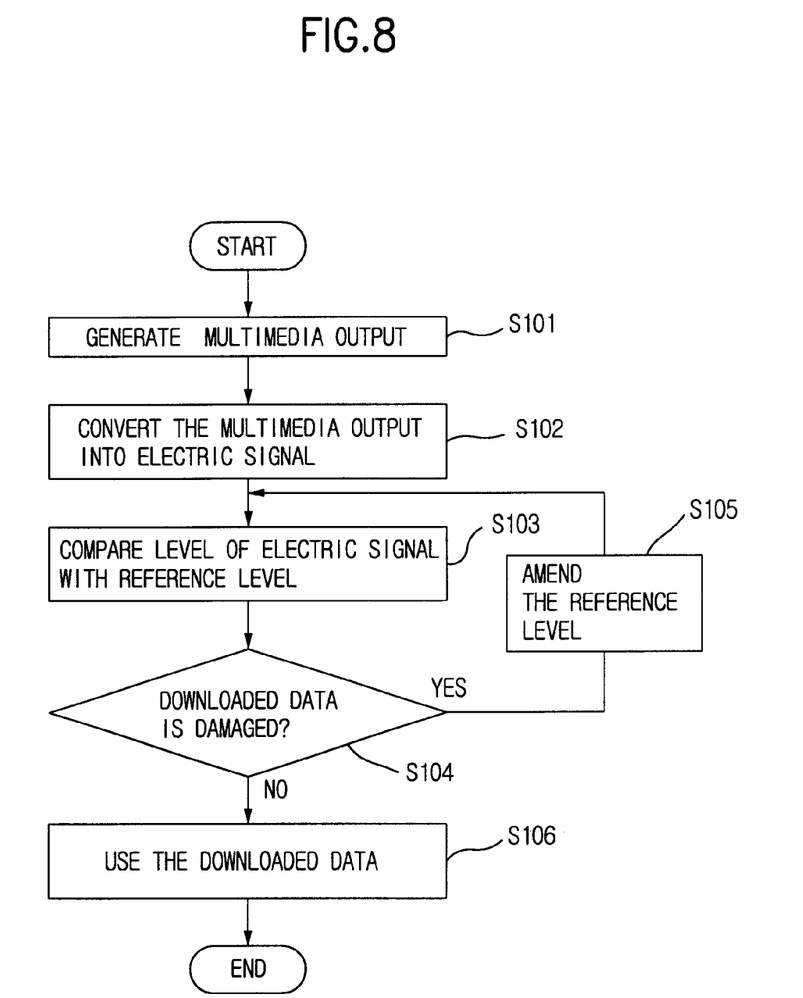
FIG. 8 is a flowchart for illustrating method according to embodiments shown in FIGS. 2 and 4 of the present invention.

FIG. 8 is a flowchart for illustrating a data download method according to embodiments shown in FIGS. 2 and 4 of the present invention.

Referring to FIG. 8, a screen output device of the multimedia device generates multimedia output such as light or/and sound representing data to be downloaded in step S101.

An optical sensor of a receiver converts the multimedia output from the screen output device into an electric signal and inputs the electric signal to an analog level comparator in step S102.

The analog level comparator compares a level of the electric signal with a reference level, i.e., a reference voltage, and converts the comparison result signal into digital signal to output the digital signal in step S103.

A digital signal input device in a microprocessor receives the digital signal from the analoge level comparator. An error correcting section judges whether downloaded data is damaged based on the comparison result signal from the comparator in step S104.

In the step S104, if the error is detected, the reference voltage of the analog level comparator is amended, so as to accurately control sensitivity until the error is absent in step S105.

In the step S104, if the error is not detected, the download data is used in step S106.

Figure 9:
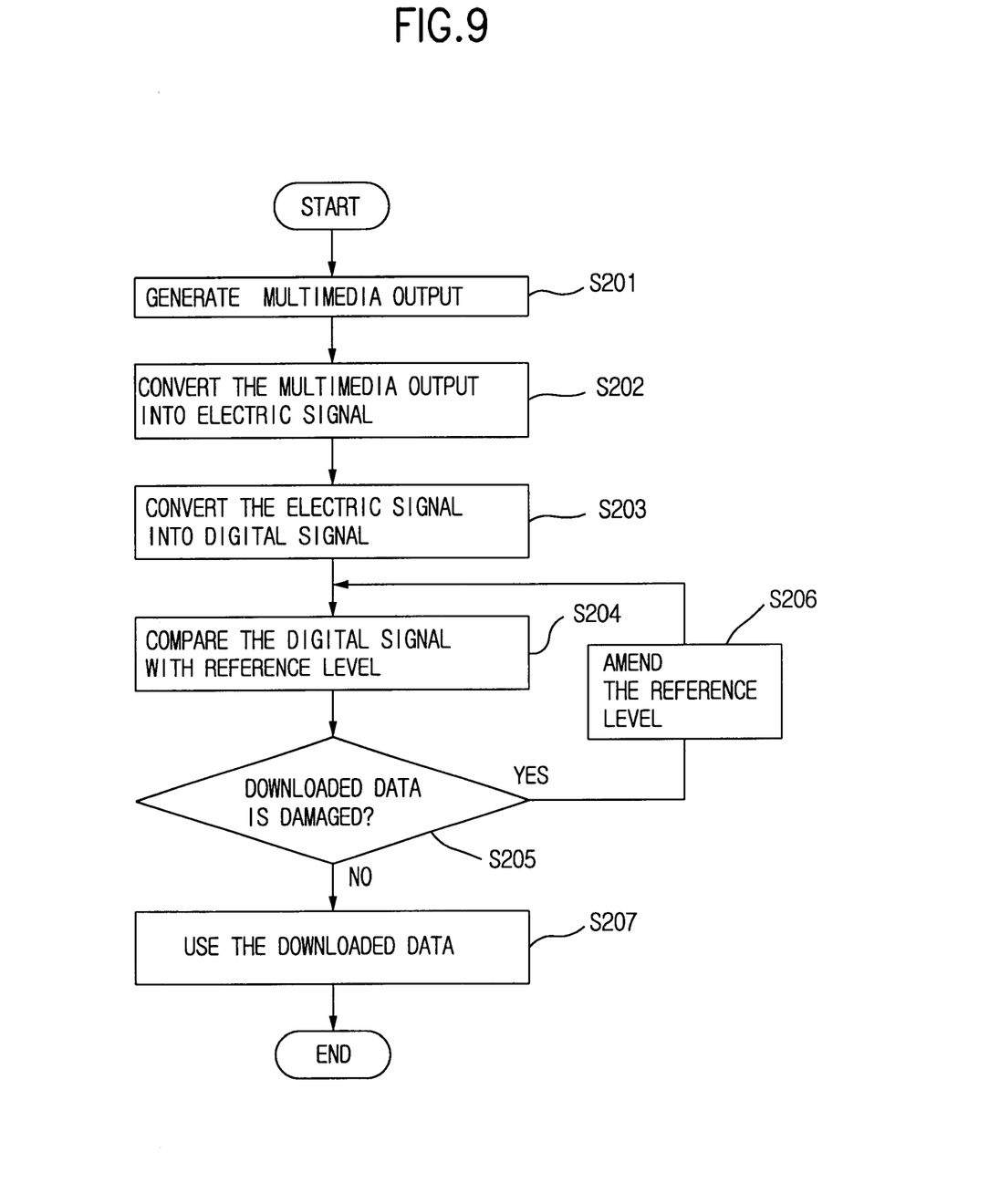
FIG. 9 is a flowchart for illustrating method according to embodiments shown in FIGS. 3 and 5 of the present invention.

FIG. 9 is a flowchart for illustrating method according to embodiments shown in FIGS. 3 and 5 of the present invention.

Referring to FIG. 9, the screen output device of the multimedia device generates a light or/and sound representing data to be downloaded in step S201.

An optical sensor of a receiver converts the light from the screen output device into an electric signal and inputs the electric signal to an analog/digital converter in step S202.

The analog/digital converter converts the electric signal from the optical sensor into a digital signal and then inputs the digital signal into a microprocessor in step S203.

The inputted digital signal is compared with a reference value, i.e., a reference voltage, in a software comparison section 305 of the microprocessor 307 so as to convert a digital value in step S204.

An error correcting section judges whether downloaded data is damaged based on the comparison result signal from the software comparison section 305 in step S205.

Herein, if an error is absent, the error correcting section judges that the download data is correct data and the download data is used in step S206.

If the error is detected, the reference voltage of the software comparison section is amended, so as to accurately control sensitivity until the error is absent in step S207.

While this invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for downloading data from a multimedia device to a receiver comprising the steps of:
    a) generating a signal which comprises the data represented by a color change of screen output in the multimedia device;
    b) converting the signal in step a) into an electric signal by receiver;
    c) comparing a level of the electric signal with a reference level and outputting a comparison result signal; and
    d) judging whether the downloaded data has an error based on the comparison result signal.

2. The method as claimed in claim 1, wherein the step c) is performed by an analog level comparator, and wherein said method further comprises the steps of:
    e) if an error is detected, adjusting the reference level of the analog level comparator, until the error is not detected; and
    f) if an error is not detected, reconstituting the data.

3. A method for downloading data from a multimedia device to a receiver comprising the steps of:
    a) generating a signal which comprises the data represented by a color change of screen output in the multimedia device;
    b) converting the signal in step a) into an electric signal by receiver;
    c) converting the electric signal into a digital signal;
    d) comparing the digital signal with a reference value and outputting a comparison result signal; and
    e) judging whether the download data has an error based on the comparison result signal.

4. The method as claimed in claim 3, wherein the step d) is performed by a software comparison section, and wherein said method further comprises the steps of:
    f) if an error is detected, adjusting the reference value of the software comparison section until the error is not detected; and
    g) if an error is not detected; reconstituting the data.

5. A data download system transmitting the data from a multimedia device to a receiver comprising the steps of:
    means for generating a signal which comprises the data represented by a color change of screen output in the multimedia device;
    means for converting the signal into an electric signal by receiver;
    means for comparing a level of the electric signal with a reference level and outputting a comparison result signal; and
    means for judging whether the downloaded data has an error based on the comparison result signal.

6. The data download system as claimed in claim 5, wherein the level comparison means is an analog level comparator which adjusts the refernce level until the error is not detected.

7. A data download system transmitting the data from a multimedia device to a receiver comprising the steps of:
    means for generating a signal which comprises the data represented by a color change of screen output in the multimedia device;
    means for converting the signal in step a) into an electric signal by receiver;
    means for converting the electric signal into a digital signal;
    means for comparing the digital signal with a reference value and outputting a comparison result signal; and
    means for judging whether the downloaded data has an error based on the comparison result signal.

8. The data download system as claimed in claim 7, wherein the level comparison means is a software comparison section which adjusts the reference value until the error is not detected.

* * * * *